United States Patent
Halkosaari et al.

(10) Patent No.: US 7,200,381 B2
(45) Date of Patent: Apr. 3, 2007

(54) COST CONTROL MANAGEMENT IN TELECOMMUNICATION SYSTEMS

(75) Inventors: Matti Halkosaari, Turku (FI); Janne Roslöf, Turku (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1185 days.

(21) Appl. No.: 09/858,937

(22) Filed: May 16, 2001

(65) Prior Publication Data

US 2001/0049656 A1  Dec. 6, 2001

(30) Foreign Application Priority Data

May 25, 2000  (GB) .................................. 0012626.8

(51) Int. Cl.
  *H04M 11/00* (2006.01)
  *H04M 1/66* (2006.01)
(52) U.S. Cl. ...................... 455/405; 455/411; 455/406
(58) Field of Classification Search ................ 455/406, 455/411, 410, 435, 445, 408, 414.1, 407, 455/432.2, 433, 435.1, 405; 705/1, 400
See application file for complete search history.

(56) References Cited

U.S. PATENT DOCUMENTS

| 6,044,259 | A | 3/2000 | Hentila et al. |
| 6,754,482 | B1* | 6/2004 | Torabi ........................ 455/410 |
| 2001/0023181 | A1* | 9/2001 | Savolainen ................. 455/411 |
| 2002/0004380 | A1* | 1/2002 | Pedersen et al. ............ 455/406 |
| 2002/0127995 | A1* | 9/2002 | Faccinn et al. ............. 455/406 |

FOREIGN PATENT DOCUMENTS

| WO | 93/12606 | 6/1993 |
| WO | 98/59504 | 3/1998 |
| WO | 99/16262 | 4/1999 |
| WO | 00/56085 | 9/2000 |

\* cited by examiner

*Primary Examiner*—Melody Mehrpour

(57) ABSTRACT

A cost control method for a mobile terminal using a mobile telecommunication system comprises sending a cost control request from a Network Element, which is an access point for the mobile terminal to the system, to a Cost Control Function. A cost control result is determined at the Cost Control Function in response to said request, and the cost control result returned to the Network Element. The result is interpreted at the Network Element and acted upon.

10 Claims, 4 Drawing Sheets

COST CONTROL MANAGEMENT IN TELECOMMUNICATION SYSTEMS

BACKGROUND

The present invention relates to cost control management in telecommunication systems and more particularly to cost control management in mobile telecommunication systems.

In today's mobile telecommunications networks, the operator of a mobile network is able to maintain tight control over the calls made and services used by its subscribers when they are at home, i.e. when they are registered with the operator's own network. For example, if a subscriber exceeds his calling credit limit the operator can notify the subscriber of this situation and/or can prevent the subscriber from making further calls until his outstanding account is settled. Similarly, where a subscriber makes use of a top-up account, e.g. using scratch cards to credit his account, an operator can restrict the subscriber's access when the subscriber's credit drops to zero. Such charging control is possible because of the introduction into mobile networks of Intelligent Network (IN) nodes which use the so-called Intelligent Network Application Part (INAP) protocol to communicate with one another. For example, a Service Switching Function (SSF) associated with a serving MSC or Gateway MSC (GMSC) of a GSM network may exchange charging information with a Cost Control Function (CCF) using INAP.

IN/INAP enables an MSC or GMSC to send charging information at regular intervals to a charging node of a subscriber's home network. However, this is only possible when the MSC/GMSC is present in the home network. In the event that a mobile subscriber is registered with an MSC/GMSC of a foreign network (i.e. the subscriber is "roaming"), Call Detail Records (CDRs) generated by the MSC/GMSC are passed to a home network through a clearing house in so-called TAP files (if necessary, multiple CDRs are collated in the foreign network and the collated CDRs are sent to the clearing house in a single TAP file). It can take at least two days or even more before the CDRs are forwarded on to the home network.

A home network cannot therefore monitor, in real time or near real time, the charges being incurred by one of its subscribers when that subscriber is roaming in a foreign network. Rather, charging information is only sent periodically from the foreign network to the home network (e.g. every few days). There therefore exists a possibility that fraud by a roaming subscriber will go undetected by the subscriber's home network for some time, and that during that time the home network operator will incur considerable losses. Furthermore, even though CDRs can be generated periodically for a subscriber when that subscriber is registered with his home network, the use of exchanges which generate CDRs at fixed regular intervals for all registered subscribers represents a non-optimal solution as the fixed interval may be too long for certain classes of subscribers and too short for others, and can unnecessarily increase the computational load in the serving exchange.

In order to overcome these problems, a mechanism referred to as Customised Applications for Mobile network Enhanced Logic (CAMEL) has been standardised by ETSI (further enhancements to CAMEL are in the process of being standardised—3GPP). CAMEL provides for the transfer of charging related information in near real time between a Service Control function (SCF) associated with a Cost Control Function (CCF) (the CCF is usually running at a Cost Control Node (CCN) located in a subscriber's home network) and a Service Switching Function (SSF) typically running at, or associated with, an MSC or GMSC (in the case of a GSM network). The SSF may be located in the same network as the CCF or in a different network. CAMEL enables an access control node to authorise a roaming subscriber for a fixed time period at the end of which the access control node must seek a new authorisation for the subscriber. It will be appreciated that one application of CAMEL is in respect of pre-paid subscribers. A protocol known as the CAMEL Application Part (CAP) protocol has been defined for the purpose of transporting CAMEL messages between a CCF and a SSF.

SUMMARY

The existing standardised network solutions and protocols supporting on-line cost control functionality (i.e. IN/INAP and CAMEL/CAP) place a heavy signalling load on the interface between traffical Network Elements (NEs), e.g. MSCs and GMSCs, and the logical entities containing the Cost Control Functionality (CCF). For example, FIG. 1 illustrates the CAP signalling required between a NE and a CCF for a given subscriber, in the case where a "prepaid" service is applied to the subscriber and Advice of Charge information is given to the subscriber's Mobile Station (MS), with the call being disconnected before the expiration of a first call duration granted by the CCF. It will be apparent that this results in a large number of signalling messages being exchanged. The implementation of this functionality also places a heavy processor load on the network. Given that the business value to operators of on-line cost control is increasing (due in part to the growth of pre-paid services), a need exists for a lightweight signalling mechanism to convey on-line cost control related signalling.

It is an object of the present invention to overcome or at least mitigate the disadvantages of existing cost monitoring proposals. In particular, it is an object of the present invention to provide a mechanism for monitoring the chargeable activities of a subscriber in such a way as to reduce charging related signalling traffic. These and other objects are achieved at least in part by moving intelligence from the SCF/CCF to the NEs.

According to a first aspect of the present invention there is provided a cost control method for a mobile terminal using a mobile telecommunication system, the method comprising the steps of:

sending a cost control request from a Network Element (NE), which is an access point for the mobile terminal to the system, to a Cost Control Function (CCF);

determining a cost control result at the CCF in response to said request;

returning the cost control result to the NE; and interpreting said result at the NE to determine the actions required, and carrying out the determined actions.

Embodiments of the present invention require only a single two-way message transfer for each cost control operation due to the fact that cost control results are interpreted at the NEs. Thus, the volume of signalling traffic between NEs and a central CCF is reduced, as is the processing load on the CCF. The actions taken by the NE in response to receipt of a cost control result may also take into account local resources and conditions.

Where the result contains an instruction to notify the mobile terminal of certain information, the step of interpreting said result may comprise determining the mechanism by which the terminal is to be notified. Suitable mechanisms may be for example a voice announcement, or an SMS or USSD message.

Preferably, the request and response messages are transported between the NE and the CCF using a lightweight transport mechanism. More preferably, the lightweight protocol is TCP/IP and the messages are encapsulated directly into the payload of IP datagrams, i.e. without any intermediate encapsulation.

Preferably, the mobile telecommunication system is a GSM based system and said NE is a Mobile Switching Centre (MSC) or Gateway MSC (GMSC). Where the system supports GPRS, the NE may be a GPRS Serving Node (GSN) or a Gateway GSN (GGSN).

Typically, the CCF is implemented in the home mobile network of the mobile terminal (or subscriber using the terminal), e.g. in a Cost Control Node (CCN). The NE may be located in the home network or in a foreign network in which the terminal is roaming.

The cost control message may relate to one of the following operations:
Initial Interrogation;
Intermediate Interrogation;
Final Interrogation.

More particularly, an Initial Interrogation operation is initiated by a setup message sent from the mobile terminal to initiate a connection. The requested call tariff information may be returned to the NE in the cost control result. Alternatively, the response may require a termination of the connection.

An Intermediate Interrogation is sent during a connection in response to a charging event. A Final Interrogation is sent upon termination of a chargeable activity.

According to a second aspect of the present invention there is provided a mobile telecommunication system, the system comprising:
  a Network Element (NE), which in use is an access point for a mobile terminal to the system;
  a Cost Control Node (CCN);
  means at the NE for sending a cost control request to the CCN;
  means at the CCN for determining a cost control result in response to receipt of said request;
  means at the CCN for returning a cost control result to the NE; and
  means at the NE for interpreting said result to determine the actions required, and for carrying out the determined actions

DETAILED DESCRIPTION

Reference has been made above to the high volume of signalling associated with CAMEL and IN related cost control mechanisms. This has been illustrated with reference to FIG. 1.

Figure 1:
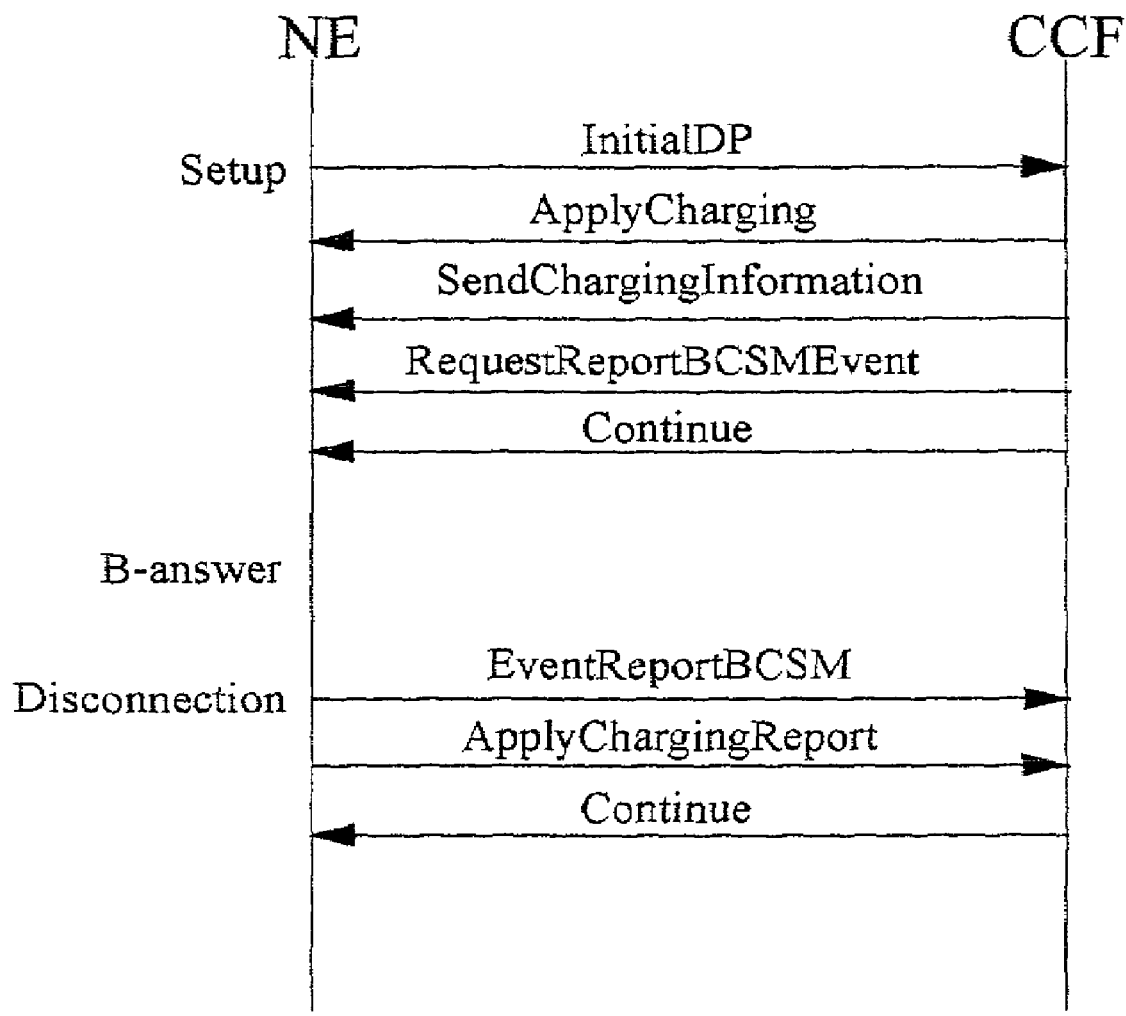
FIG. 1 illustrates cost control related signalling in a mobile telecommunication system using CAMEL.
Figure 2:
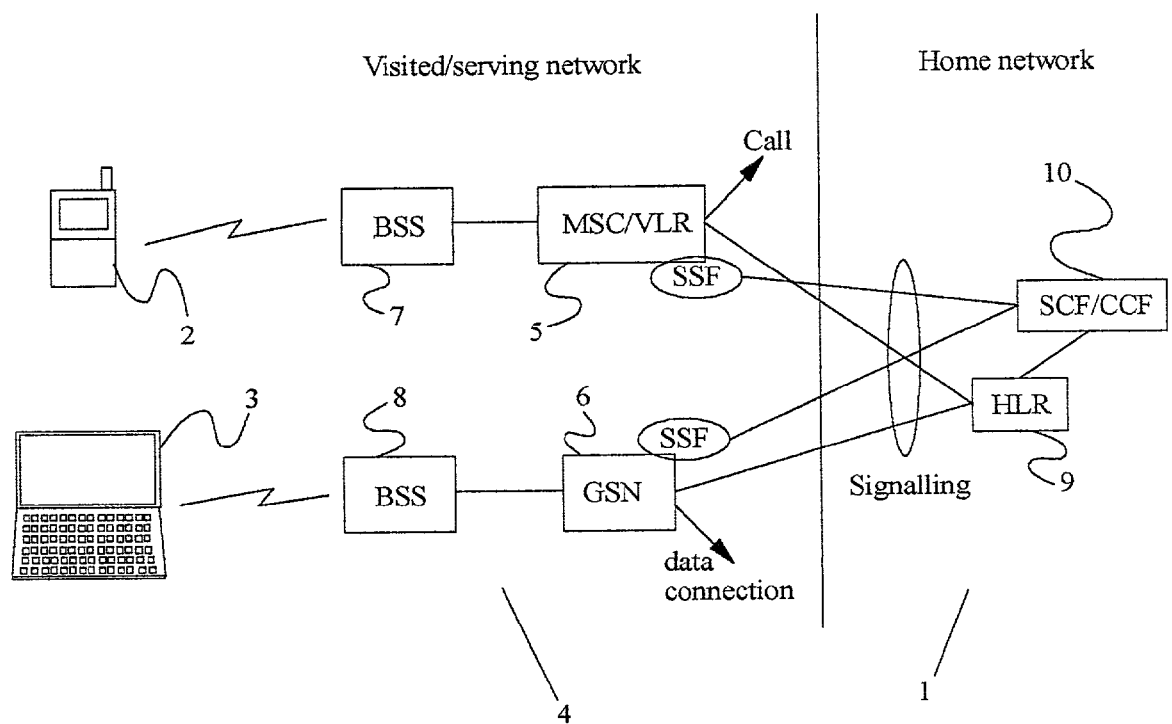
FIG. 2 illustrates a telecommunication system comprising two interconnected PLMNs.

There is illustrated in FIG. 2 a telecommunications system comprising two interconnected Public Land Mobile Networks (PLMNs). For the purposes of the following illustration, a first of the PLMNs 1 represents the home network of a subscriber using a mobile telephone 2 or wireless data terminal 3, and is referred to as the Home PLMN (HPLMN). The second of the PLMNs 4 is referred to as the Visited PLMN (VPLMN). Only those nodes of the networks 1,4 relevant to the following discussion are illustrated in FIG. 1. Both of the networks 1,4 are Global System for Mobile communications (GSM) based networks and support GPRS. Illustrated in the VPLMN 4 are a Mobile Switching Centre (MSC) 5 (which is co-located with a Visitor Location Register (VLR)) and a GPRS Serving Node (GSN) 6 which are responsible for connecting and routing voice and data calls respectively. Both the MSC/VLR 5 and the GSN 6 are coupled in use to the subscriber equipment 2,3 via Base Station Sub-systems (BSS) 7,8. The networks 1,4 are coupled together via Gateway nodes although these are not illustrated in FIG. 1.

Illustrated in the HPLMN 1 is a Home Location Register (HLR) 9. The HLR 9 maintains a record of all of the subscribers of the HPLMN 1, including the International Mobile Subscriber Identity (IMSI) for each subscriber and which is used by a subscriber to register with a network. A Service Control Function (SCF)/Cost Control Function (CCF) is implemented at a Cost Control Node (CCN) 10 which, together with a HLR 9, forms part of a Home Subscriber System. For each subscriber, the SCF/CCF 10 records details of the tariff to which the subscriber subscribes. For example, a subscriber may subscribe to a "business tariff" which defines the cost of voice calls in terms of caller location, called party destination, duration, and time of day. The cost of data calls may also be defined using these same conditions, and additionally the volume of data sent to and/or received by the subscriber during a data call and the Quality of Service (QoS) involved.

Associated with each MSC 5 is a Visitor Location Register (VLR) which maintains a record of subscribers currently registered with the associated MSC 5. The record includes subscribers for whom the MSC 5 is a home MSC, as well as subscribers for whom the MSC 5 is a foreign network. In the event that the subscriber using the mobile telephone 2 roams outside of the coverage area of his HPLMN 1 and into the coverage area of the VPLMN 4, his telephone 2 will seek to register with an MSC 5 of the VPLMN 4 after the MSC 5 has determined that the subscriber is a subscriber of a foreign network and has not already been registered in the associated VLR.

The registration process is initiated by the telephone 2 sending to the serving MSC 5 the subscribers IMSI (usually stored in a SIM card). In order to authenticate the subscriber, the MSC 5 uses the Mobile Application Part (MAP)protocol to send a MAP UPDATE_LOCATION message to the HLR 9 of the subscriber's HPLMN 1 (the HPLMN 1 is identified by a prefix part of the IMSI). This exchange of signalling is typically carried out over an SS7 signalling network. Assuming that the HLR 9 verifies the IMSI contained in the message, the HLR 9 returns a MAP INSERT SUBSCRIBER DATA message to the serving MSC. Registration of the wireless data terminal 3 with the GSN 6 involves a similar exchange of messages with the HLR 9 of the HPLMN 1. Assuming that the serving node (MSC 5 or GSN 6) does indeed receive a MAP INSERT_SUBSCRIBER DATA message from the HLR 9 of the HPLMN 1, the subscriber is registered with the serving node. (The GSN 6 also makes use of the VLR which is co-located with the MSC 5, although it is noted that the GPRS network may sometimes posses a separate VLR which may or may not be co-located with the GSN.)

In the event that a subscriber initiates a connection, e.g. a data call to a subscriber of the same or a different network, a Service Switching Function (SSF) implemented by the SGSN 6 contacts the CCF (of the CCN 10) of the HPLMN 1. The correct CCF is identified to the SSF in the INSERT_SUBSCRIBER_DATA message previously received from the HLR 9. Signalling between the SSF and the CCF is carried out according to an "On-line Charging Protocol" (OCHP), the messages of which are directly encapsulated in IP datagrams for transport over an TCP/IP network coupling the SSF and CCF. The OCHP is a protocol solution designed especially for the efficient transfer of on-line cost control data between the NE. e.g. MSC/GSN, and CCF. A key element of the concept, compared with current pre-paid solutions, is that the traffic control functionality is moved from a separate SSF down to the NE level.

Figure 3:
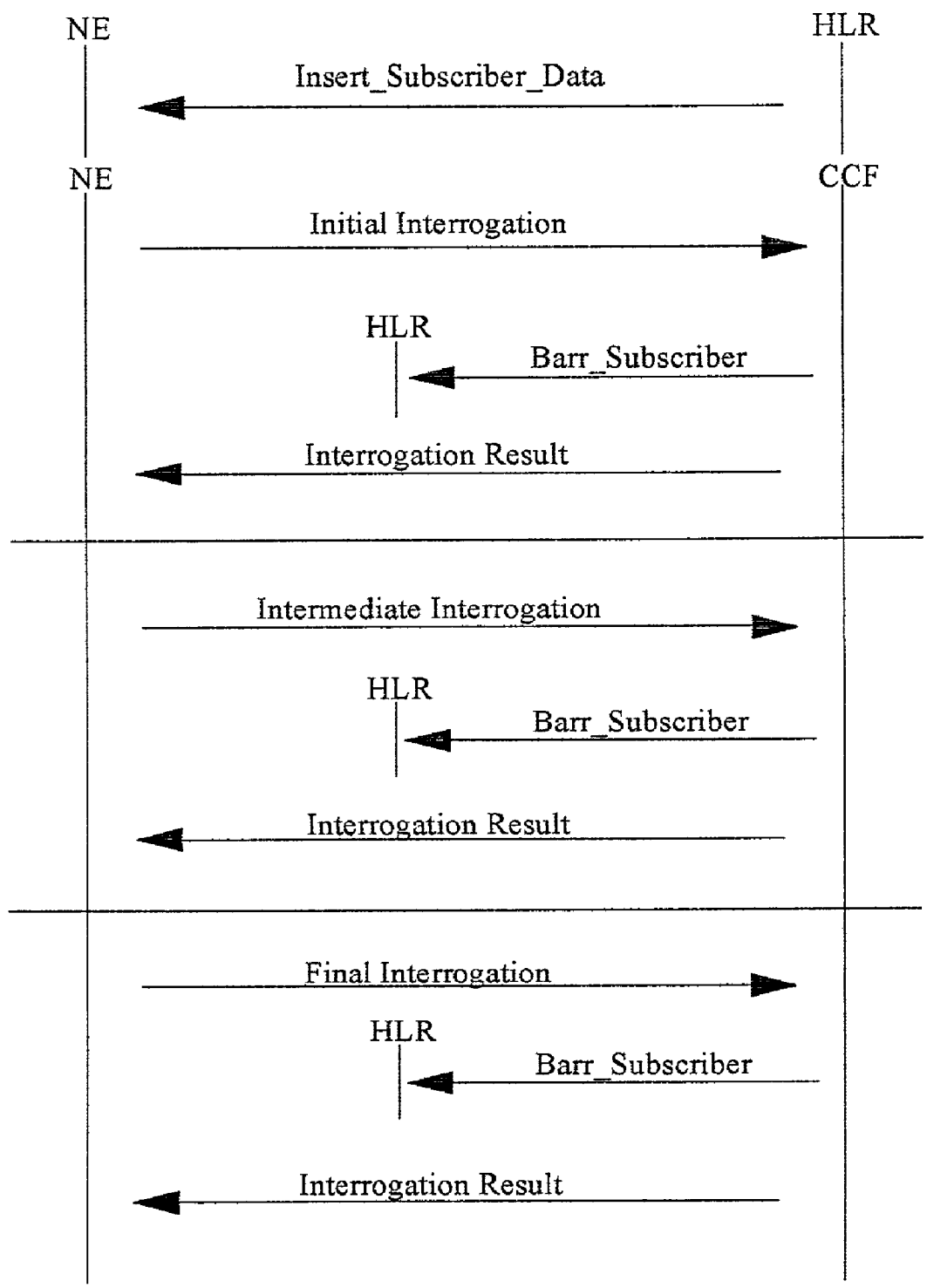
FIG. 3 illustrates cost control related signalling in the system of FIG. 2, using a lightweight transport mechanism.

FIG. 3 illustrates the cost control mechanism procedure, commencing with the receipt of a CCF subscription category by the NE, from the HLR. The subscriber category may contain information dealing with the type of the subscriber service, e.g. which events should be reported to the CCF during the traffic activity. The NE contains intelligence enabling the creation of an OCHP interface towards the CCF as well as the ability to control the traffic based on the information received via the interface. The following three phases may then occur.

Initial Interrogation

The NE sends an OCHP operation INITIAL INTERROGATION (Initial_IR) to the CCF. The operation opens a dialog towards the CCF and contains all the information required for the CCF to be able to rate the traffic and perform correct account operations for the service subscriber in question. For example, in the case of an ordinary voice call, the Initial_IR operation contains data dealing with:
- calling and called party numbers;
- information on service and subscription categories;
- IMSI number;
- information on the location area and used access capabilities;
- NE identity data;
- information on the event that triggered the interrogation; and
- other charging specific data.

Interrogation Result,

The CCF analyzes the received data, rates the traffic and performs operations, e.g. dealing with the subscriber's account balance. If necessary, the CCF is able to bar the subscriber in the HLR (illustrated in FIG. 3 by a broken line). Thereafter the CCF sends an OCHP operation INTERROGATION RESULT (IR_Result) to the NE. The operation contains information based upon which the NE is able to continue with the processing of the traffic. This information includes:
- CCF session identity;
- account and subscription status information (i.e. is the traffic allowed);
- tariff data; and
- information on the validity of the data, i.e. the validity time/volume of the current Tariff data.

The NE continues with the processing of the traffic. According to the information received from CCF the NE is able to perform one or more of the following actions:
- continue with the traffic;
- release the traffic;
- route the traffic to an external IP (Intelligent Peripheral);
- notify the user about low account balance;
- notify the user about account balance expiration; and
- prompt user to increase account balance.

Intermediate Interrogation

In the event that a charging related event occurs during the traffic (or the validity of the information received in the first IR_Result expires), the NE sends an OCHP operation INTERMEDIATE INTERROGATION (Inter_IR) to the CCF. The events to be reported in an Inter_IR operation are generally statically armed by the subscriber category received from the HLR (dynamic arming by the CCF may also occur during an ongoing connection).

The operation contains information defining the occurred event, the current parameter values, and timing information regarding the interval between the occurred event and the most recent interrogation (Initial_IR or Inter_IR) operation sent (in the case of GPRS, instead of or in addition to timing information, the sent information may include data volume information). In order to simplify the processing of data in the CCF, the Inter_IR operation contains a complete set of the parameters (see Initial_IR).

The CCF analyzes the received data, updates the session and performs required operations. Thereafter, the CCF sends a new IR_Result operation (see above) to the NE which is then again able to continue with the traffic. The Inter_IR/IR_Result signalling pair may, naturally, be required several times during a CCF session.

Final Interrogation

When the chargeable activity is ended, the NE sends an OCHP operation FINAL INTERROGATION (Final_IR) to the CCF. The operation contains information relating to the final status of the traffic, especially the timing information regarding the interval after the most recent interrogation (Initial_IR or Inter_IR) operation sent. After receiving the Final_IR, the CCF updates the subscriber's account information, closes the session, and performs other possible actions dealing with charging control. The CCF can also return final charging information (price) relating to the just ended session in an additional IR_Result operation to the NE, if supported by the NE (indicated in Final_IR operation).

Figure 4:
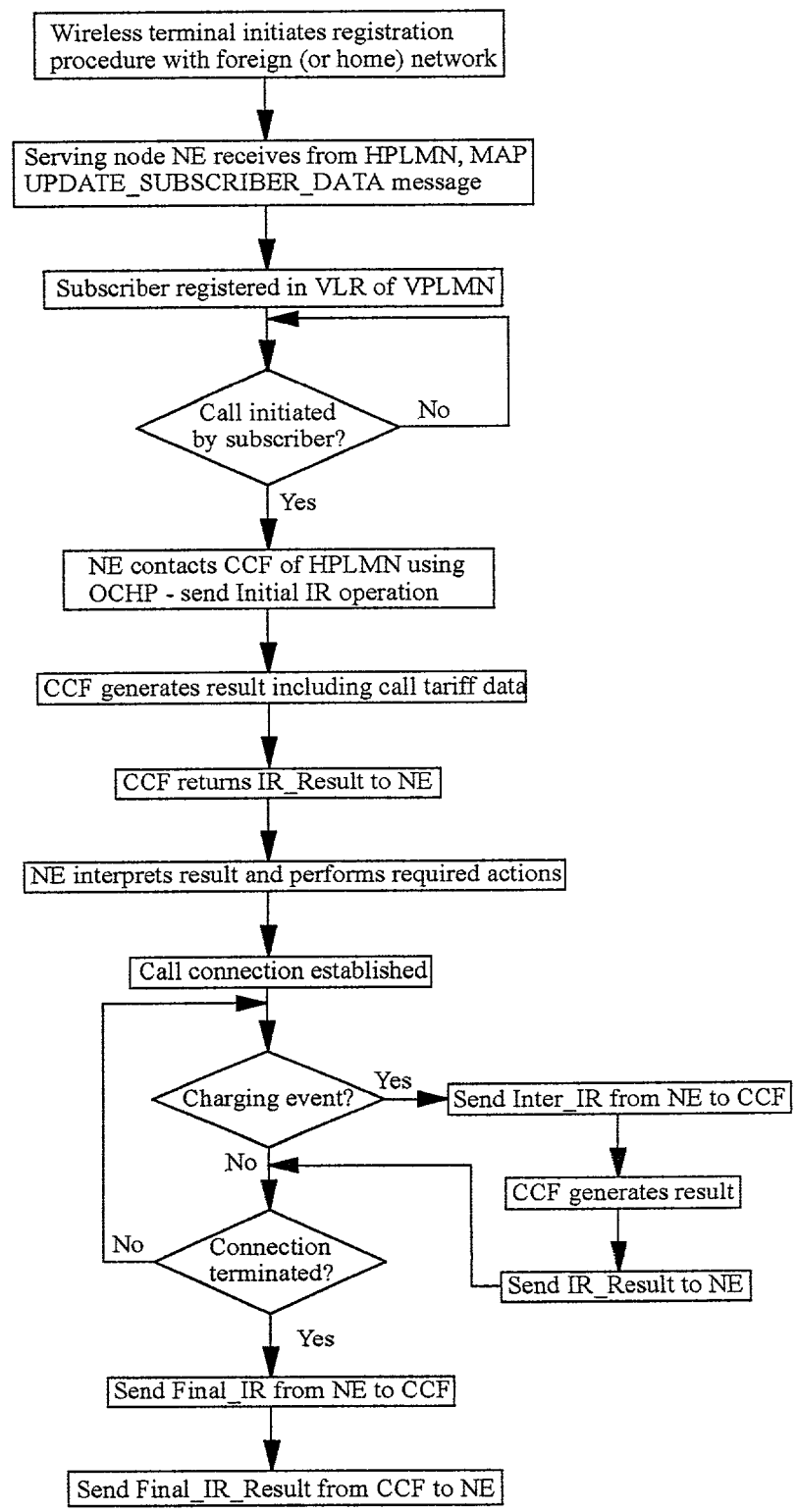
FIG. 4 is a flow diagram illustrating a cost control procedure in the system of FIG. 2.

The charge control mechanism described above is further illustrated in the flow diagram of FIG. 4.

It will be appreciated that various modifications may be made to the above described embodiment without departing from the scope of the present invention. In particular, it will be appreciated that a subscriber terminal 2,3 may be registered with a NE (e.g. MSC, GSN) which is located in the same network as the CCN 10. It will also be appreciated that the NE may be a GMSC, GGSN, or any other suitable element.

The invention claimed is:

1. A cost control method for a mobile terminal using a mobile telecommunication system, the method comprising the steps of:
   sending a cost control request from a Network Element (NE) said NE being an access point for the mobile terminal to the system, to a Service Control Function (SCF)/Cost Control Function (CCF) associated with the mobile terminal;
   creating an Online Charging Protocol (OCHP) interface for transporting messages;

determining a cost control result at the CCF in response to said request;

bypassing the SSF and returning the cost control result from the CCF directly to the NE via the OCHP interface; and interpreting said result at the NE to determine the actions required, and carrying out the determined actions.

2. The method according to claim 1, wherein said result contains an instruction to notify the mobile terminal of certain information, and the step of interpreting said result comprises determining the mechanism by which the terminal is to be notified.

3. The method according to claim 1, wherein the OCHP is a lightweight transport mechanism utilized for online cost control data between the NE and the CCF.

4. The method according to claim 1, wherein the lightweight transport mechanism is TCP/IP and the messages are encapsulated directly into the payload of IP datagrams.

5. The method according to claim 1, wherein the mobile telecommunication system is a UMTS based system.

6. The method according to claim 1, wherein the mobile telecommunication system is a GSM based system and said NE is a Mobile Switching Centre (MSC) or Gateway MSC (GMSC).

7. The method according to claim 1, wherein the telecommunication system supports GPRS, and the NE is a GPRS Serving Node (GSN) or a Gateway GSN (GGSN).

8. The method according to claim 1, wherein the CCF is implemented in a home mobile network of the mobile terminal.

9. The method according to claim 1, wherein the lightweight transport mechanism comprises operations including:

an Initial Interrogation for opening dialog between the NE and the CCF, the Initial Interrogation containing all the information for the CCF to rate traffic and perform account operations;

an Intermediate Interrogation for the CCF communicating information for continuing traffic processing to the NE; and a Final Interrogation for relating the final status of the traffic.

10. A mobile telecommunication system, the system comprising:

a Network Element (NE), which in use is an access point for a mobile terminal to the system and adapted for creating Online Charging Protocol interface between the NE and a Cost Control Function associated with the mobile terminal;

a Cost Control Node (CCN) comprising the CCF;

means at the NE for sending a cost control request to the CCN, wherein the CCF receives the cost control request;

means at the CCF for determining a cost control result in response to receipt of said request;

means at the CCN for returning a cost control result to the NE, wherein the CCF communicates the result directly to the NE via the OCHP interface; and means at the NE for interpreting said result to determine the actions required, and for carrying out the determined actions.

* * * * *